(12) United States Patent
Morris et al.

(10) Patent No.: US 10,078,349 B1
(45) Date of Patent: Sep. 18, 2018

(54) STRAP SYSTEM FOR ATTACHING TO HEAD-MOUNTED DISPLAY

(71) Applicant: Oculus VR, LLC, Menlo Park, CA (US)

(72) Inventors: Quintin Morris, Issaquah, WA (US); Peter Wesley Bristol, Seattle, WA (US); Scott Andrew Dallmeyer, Seattle, WA (US); Mauricio Romano, Redmond, WA (US); Shane Michael Ellis, Bellevue, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/652,069

(22) Filed: Jul. 17, 2017

Related U.S. Application Data

(60) Provisional application No. 62/457,895, filed on Feb. 11, 2017.

(51) Int. Cl.
*F16M 13/04* (2006.01)
*A45F 5/00* (2006.01)
*G06F 1/16* (2006.01)

(52) U.S. Cl.
CPC ............. *G06F 1/163* (2013.01); *F16M 13/04* (2013.01)

(58) Field of Classification Search
CPC ...... A45F 2200/0525; A45F 2200/0516; A45F 5/00; A45F 2005/008; G06F 1/1628
USPC .......................................................... 224/218
See application file for complete search history.

(56) References Cited

U.S. PATENT DOCUMENTS

| | | | | |
|---|---|---|---|---|
| 4,348,775 A | * | 9/1982 | Haslbeck | ................ A61F 9/027 2/446 |
| 6,349,421 B2 | * | 2/2002 | Fukasawa | ............ A63B 33/002 2/428 |
| 2009/0161348 A1 | * | 6/2009 | Spartano | ................. F21L 14/00 362/105 |
| 2017/0103573 A1 | * | 4/2017 | Drinkwater | ........ G02B 27/0179 |

\* cited by examiner

*Primary Examiner* — Adam Waggenspack
(74) *Attorney, Agent, or Firm* — Fenwick & West LLP

(57) ABSTRACT

Embodiments relate to a strap system having a securing plate and a strap. The securing plate is configured to be secured to a body of a head-mounted display in a rotatable manner. The securing plate includes a flat portion, a rear loop located at a first end of the flat portion, and a front loop located at a second end of the flat portion. The strap is inserted through the rear loop and the front loop of the securing plate. An end portion of the strap is flipped over the front loop and secured to a portion of the strap on the flat potion of the securing plate to fix the strap to the securing plate.

15 Claims, 14 Drawing Sheets

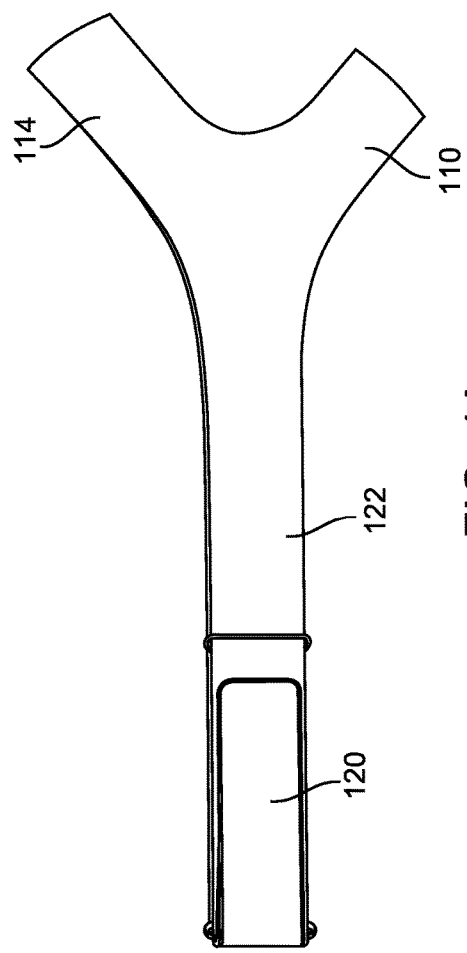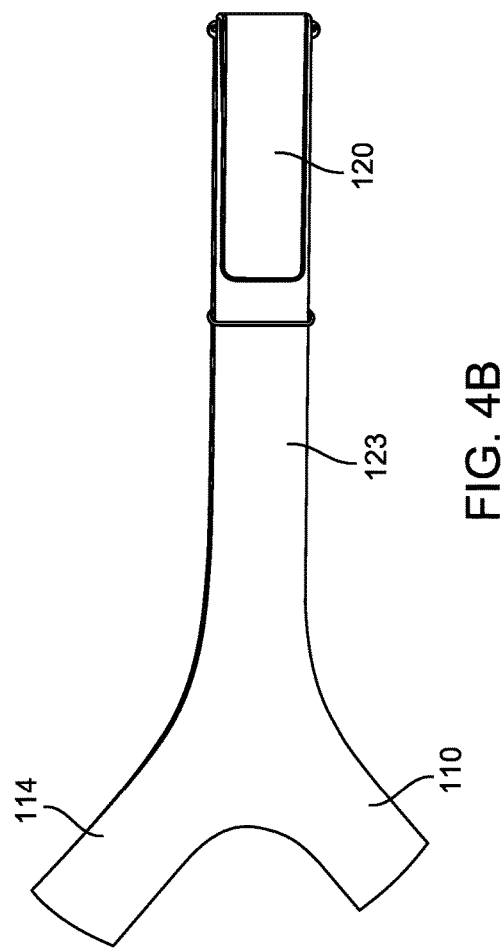
FIG. 4A
FIG. 4B

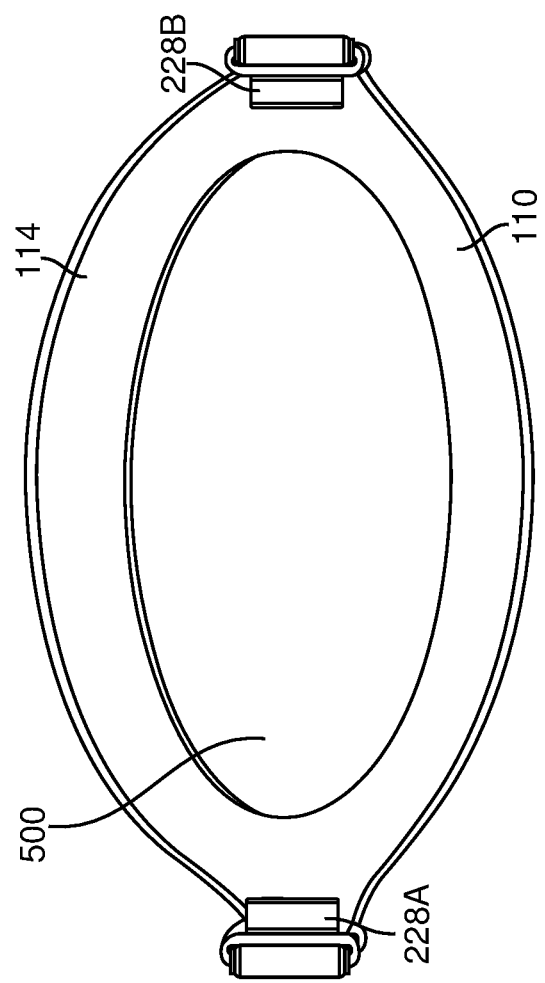

US 10,078,349 B1

STRAP SYSTEM FOR ATTACHING TO HEAD-MOUNTED DISPLAY

BACKGROUND

Field of the Disclosure

The present disclosure generally relates to a strap system for a head-mounted display, and specifically to a strap system for pivotably and adjustably attaching a strap to a head-mounted display.

Description of the Related Art

Head-mounted displays (HMDs) have wide applications in various fields, including engineering design, medical surgery practice, military simulated practice, and video gaming. For example, a user wears an HMD while playing video games so that the user can have a more interactive experience in a virtual environment.

As opposed to other types of display devices, an HMD is worn directly over a user's head. The HMD may directly interface with a user's face while exerting pressure onto the user's head due to its weight. Hence, a strap system is used in the HMD to secure the HMD securely to the user's head in a comfortable manner.

SUMMARY

Embodiments relate to a strap system having a securing plate and a strap attached to the securing plate. The securing plate is secured to a body of a head-mounted display in a rotatable manner. The securing plate includes a flat portion, a rear loop located at a first end of the flat portion, and a front loop located at a second end of the flat portion. The strap is inserted through the rear loop and the front loop of the securing plate. An end portion of the strap is flipped over the front loop and secured to a portion of the strap on the flat potion of the securing plate to fix the strap to the securing plate.

BRIEF DESCRIPTION OF THE DRAWINGS

The teachings of the embodiments can be readily understood by considering the following detailed description in conjunction with the accompanying drawings.

FIG. 4A is a left view of the strap system, in accordance with an embodiment.

FIG. 4B is a right view of the strap system, in accordance with an embodiment.

FIG. 5 is a front view of the strap system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a strap system for securing a HMD to a head of user where the lengths of straps are adjustable and the orientation of the straps relative to the HMD is rotatable for comfortable fit and use of the HMD. The strap system includes securing plates at each side. Each securing plate has loops to receive an end of the strap. The end of the strap is inserted into the loops and folded back onto itself. The securing plates are secured to the body of the HMD in a rotatable manner.

Figure 1:
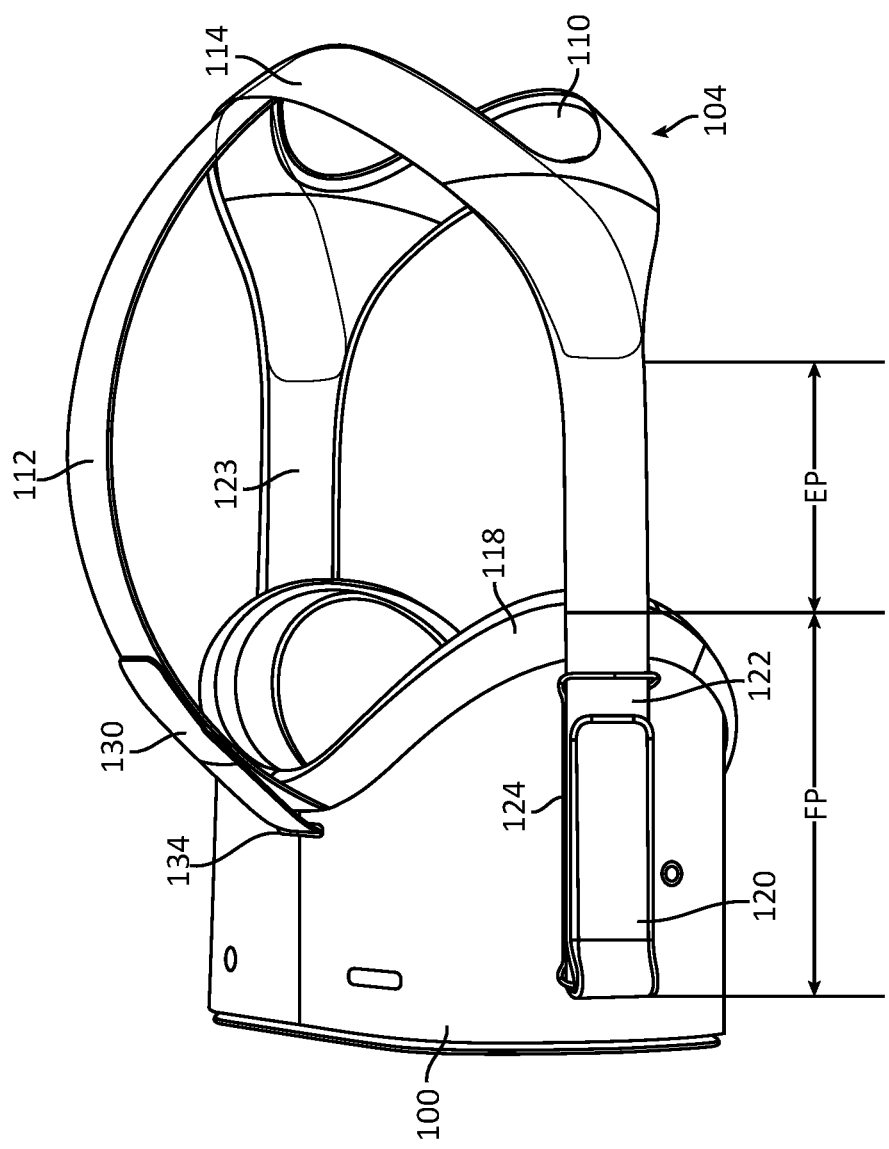
FIG. 1 is an example perspective view of a HMD attached with a strap system, in accordance with an embodiment.

FIG. 1 is an example perspective view of a HMD attached with a strap system, in accordance with an embodiment. The HMD includes, among other components, a body 100 and a facial interface 118 attached to the body 100. The body 100 includes various components such as a display panel, optical elements, and circuits (not shown). The facial interface 118 is made of a material softer than the body 100 and comes into contact with a user's face when the HMD is worn by the user.

The body 100 is attached with straps at both sides (i.e., the left side and the right side). As shown in FIG. 1, the left side of the strap 122 is inserted to the body 100 via securing plate 124, as described below in detail with reference to FIG. 2. The left side of the strap 122 includes a fixing portion FP which is used for adjusting the length of the strap and an elastic portion EP made of material more resilient than the fixing portion FP. The overlapping of the fixing portion FP can be adjusted to control the length of the strap. That is, the overlapping of the strap in the fixing portion FP is increased to shorten the left side of the strap 122 and loosen the strap system whereas the overlapping of the strap in the fixing portion FP is decreased to lengthen the left side of the strap 122 and tighten the strap system. The elastic portion EP stretches when the left side of the strap 122 is pulled to enable the strap system to apply resilient force to press the facial interface 118 towards the user's face and secure the HMD.

The right side of the strap 123 has the same structure as the left side of the strap 122 except that the right side of the strap 123 is attached to the right side of the body 100 and is symmetric in shape compared to the left side of the strap 122.

The strap system includes a rear portion 104 that includes an upper bridge 114 and a lower bridge 110 that connects the left side of the strap 122 and the right side of the strap 123. The rear portion of the strap system also includes a center bridge 112 that connects the upper bridge 114 to the body 100. In one embodiment, the upper bridge 114 is slightly longer than the lower bridge 110.

A hole 134 is formed in the body 100 to receive an end of the center bridge 112. The end of the center bridge 112 enters below an edge of the body 100 and then comes out through the hole 134. The end coming out of the hole 134 folds back onto the other portion of the center bridge 112 and overlaps with the other portions of the center bridge to secure the center bridge 112 to the body 100. The center bridge 112 may include Velcro on the upper surface and lower surface of the center bridge so that the end portion of the center bridge 112 is secured onto the other portion of the center bridge 112 when pressed against the other portion of the center bridge 112. The detailed structure of the rear portion 104 of the strap system is described below in detail with reference to FIGS. 10A through 10C. The user may adjust the length of the center bridge 112 by detaching the end portion of the center bridge 112 from the other portion of the center bridge 112 and changing the location of the center bridge 112 where the end portion of the center bridge 112 is attached.

Figure 2:
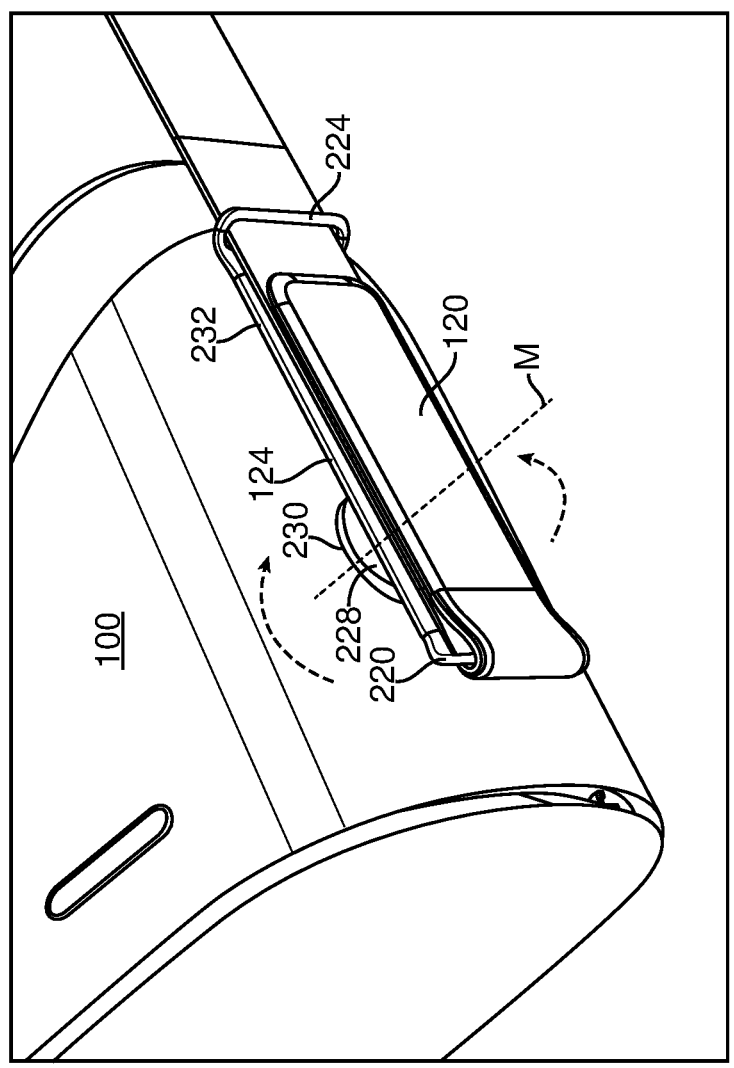
FIG. 2 is an enlarged view of a joint portion of the strap system attached to the HMD, in accordance with an embodiment.

FIG. 2 is an enlarged view of a joint portion of the strap system attached to the body 100 of the HMD, in accordance with an embodiment. The strap system has a securing plate 124 attached to both the right and left straps. The securing plate 124 includes a flat portion 232, a cylindrical protrusion 228 at a side of the flat portion 232, and loops 220, 224 at the front end and the rear end of the flat portion 232.

The cylindrical protrusion 228 is snuggly inserted into a hole 230 formed in the body 100 of the HMD so that the friction between the cylinder protrusion 228 and the hole 230 enables the relative rotation of the securing plate 124 only when a torque or force above a threshold is applied. The securing plate 124 may rotate relative to the body 100 about axis M extending generally in a horizontal direction when the HMD is worn by the user, as shown by arrows. By enabling the relative rotation between the body 100 and the securing plate 124, the strap system can be rotated relative to the body 100 and thereby adjust pressure exerted by different portions of the facial interface 118 and the user's viewing angle of display panel in the body 100. In alternative embodiments, mechanisms such as a gear and a latch may be provided additionally to give resistance to the relative rotation of the body 100 and the securing plate 124.

The flat portion 232 supports the end portion 120 of the strap inserted through the loops 224. The end portion 120 includes Velcro that enables the overlapping end portions 120 of the strap to attach in a secure manner. When attaching the strap system to the body 100, an end of the strap 120 is first inserted into loop 224, inserted into loop 220, and then pulled back over the loop 220 so that the strap 120 folds onto itself. By pressing the flipped portion of the strap 120 onto the portion of the strap resting on the flat portion 232 of the strap, these portions of the strap are attached by the adhesive force of Velcro. In this way, the strap is secured to the securing plate 124 and the body 100 of the HMD.

The flat portion 232 and the loops 220, 224 at the rear and front ends define the general direction along which the left and right sides of the straps 122, 123 extend. That is, the left and right sides of the straps 122, 123 extend towards the rear of the HMD in a direction that is generally parallel to a line between centers of the holes of the loops 220, 224. In alternative embodiments, the securing plate may include a curved middle section or angled sections instead of a flat portion 232.

In one embodiment, the securing plate 124 is made of metal or plastic with sufficient durability.

Figure 3:
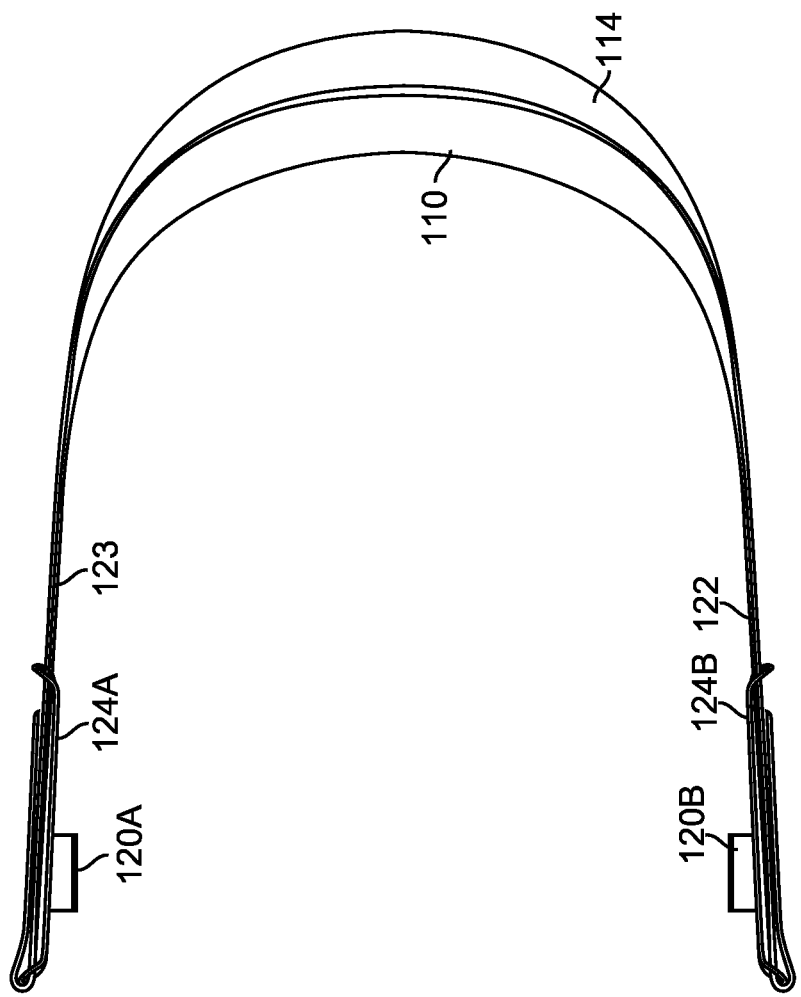
FIG. 3 is an upper view of the strap system, in accordance with an embodiment.

FIG. 3 is an upper view of the strap system, in accordance with an embodiment. The left and right sides of the strap system are symmetrical in shape, and include securing plate 124A for the right side of the strap 123 and securing plate 124B for the left side of the strap 122. For convenience, the body 100 of the HMD and the center bridge 112 is not illustrated in FIG. 3. The strap further includes a lower bridge 110 and an upper bridge 114. The lower bridge 110 and the upper bridge 114 connect the left side of the strap 122 to the right side of the strap 123. The lower bridge 110 and the upper bridge 114 are configured to rest on the back side of a user's head. In some embodiments, the lower bridge 110 and the upper bridge 114 are curved to mimic the contour of a person's head.

Figure 6:
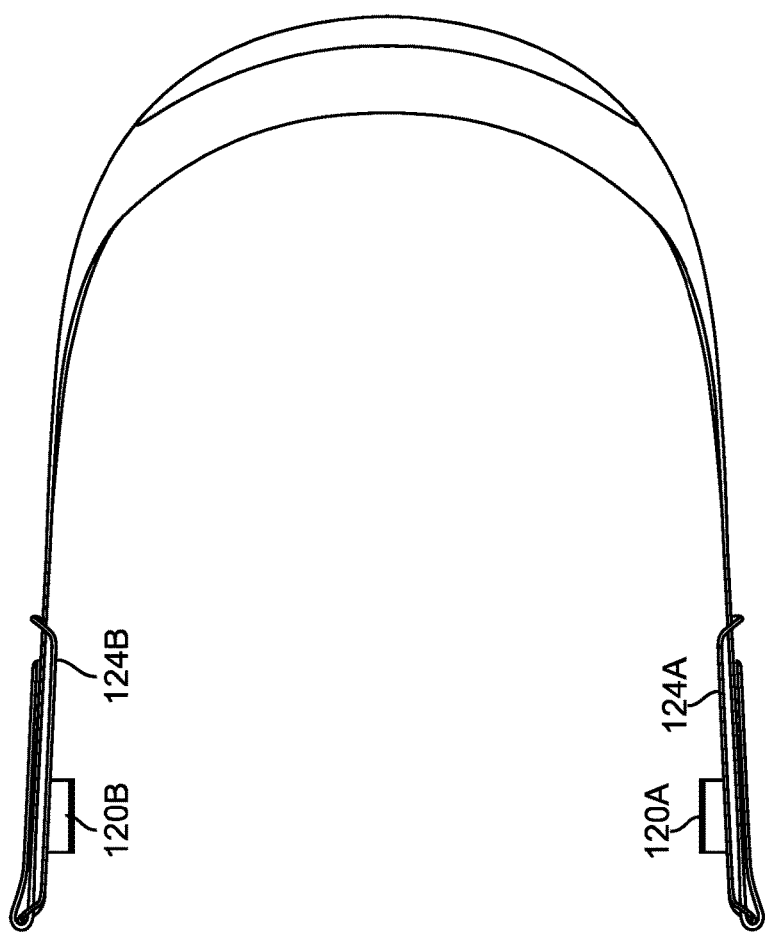
FIG. 6 is a bottom view of the strap system, in accordance with an embodiment.
Figure 7:
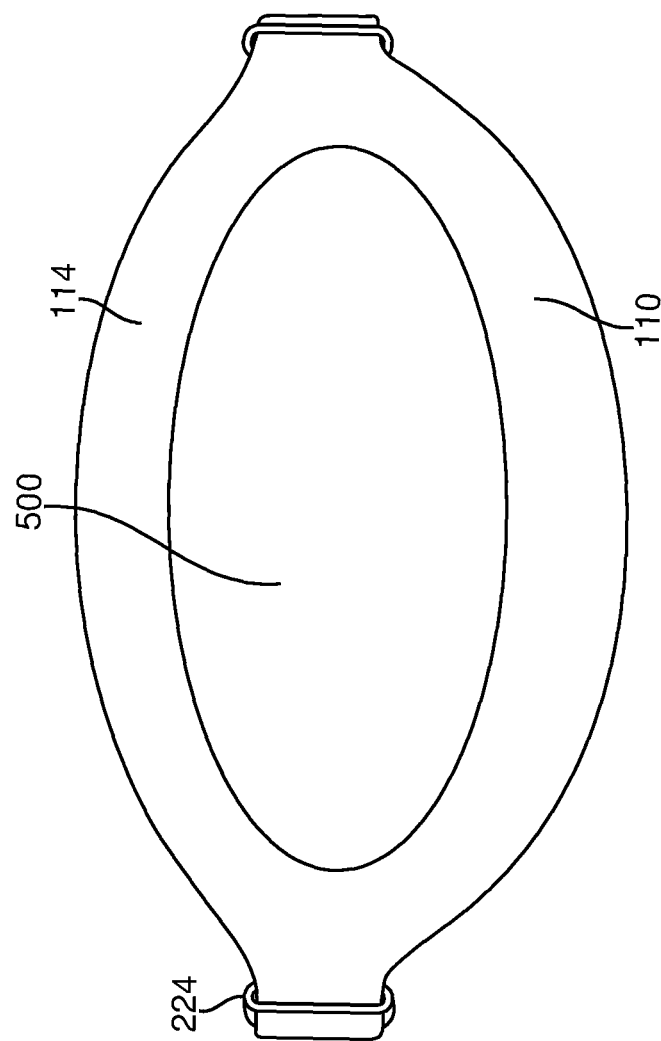
FIG. 7 is a rear view of the strap system, in accordance with an embodiment.
Figure 8:
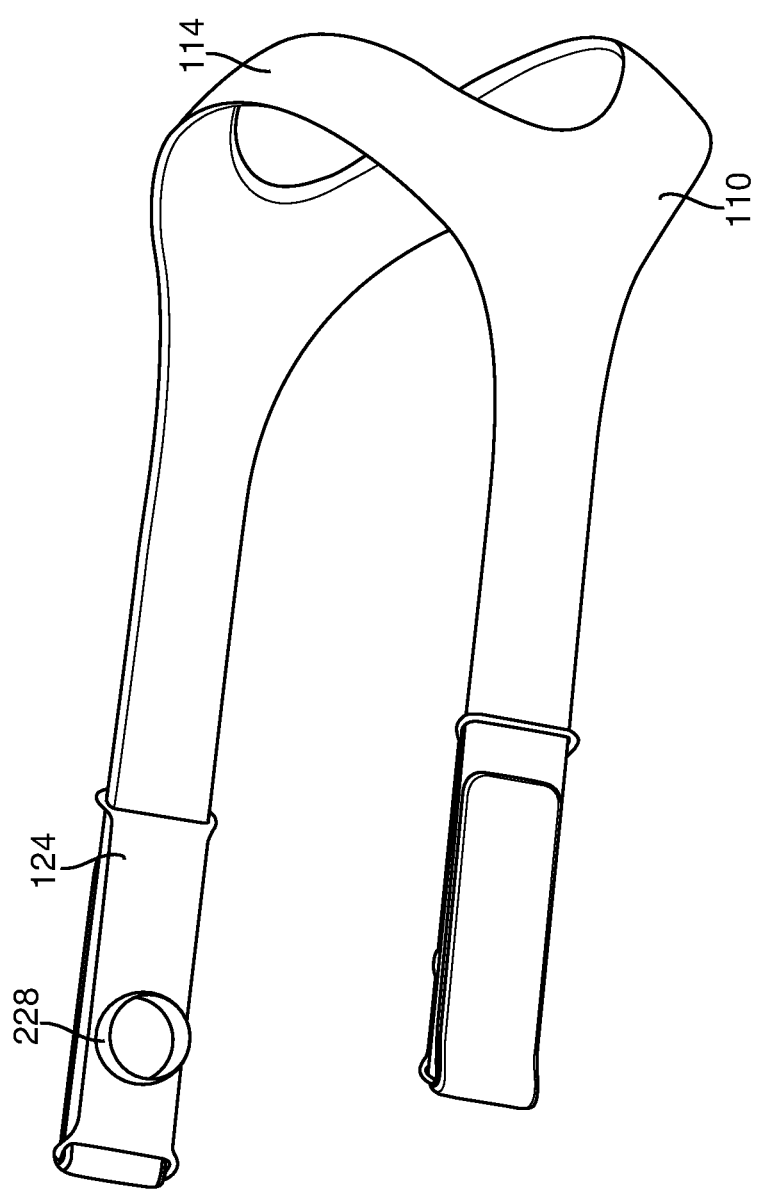
FIG. 8 is a perspective view of the strap system, in accordance with an embodiment.

FIG. 4A is a left view of the strap system in accordance with an embodiment and FIG. 4B is a right view of the strap system in accordance with an embodiment. FIG. 5 is a front view of the strap system in accordance with an embodiment. FIG. 6 is a bottom view of the strap system in accordance with an embodiment. FIG. 7 is a rear view of the strap system in accordance with an embodiment. FIG. 8 is a perspective view of the strap system in accordance with an embodiment. In FIGS. 4A through 8, the body 100 of the HMD and the center bridge 112 are omitted for the sake of convenience and ease of illustration.

As illustrated in FIGS. 4A through 8, the lower bridge 110 is angled downwards compared to the left side of the strap 122 and the right side of the strap 123. Furthermore, the upper bridge is angled upwards compared to the left side of the strap 122 and the right side of the strap 123. As shown in FIG. 5 and FIG. 8, an opening 500 is formed between the upper bridge 114 and the lower bridge 110.

Figure 9A:
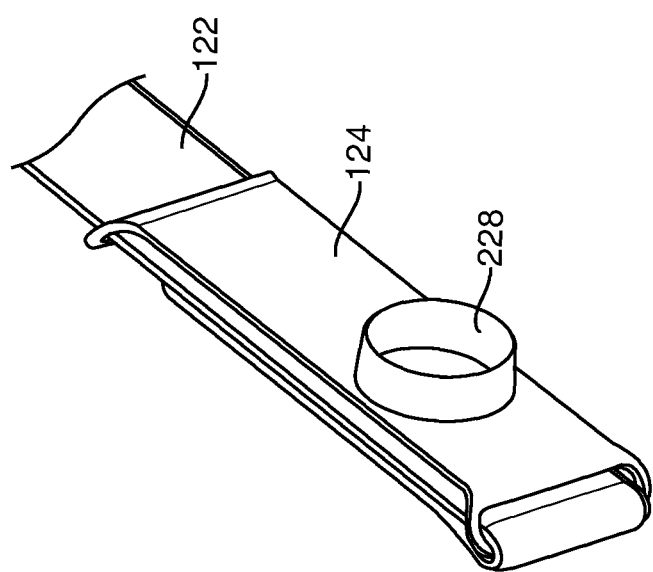
FIG. 9A is an enlarged view of the securing plate showing the cylindrical protrusion, in accordance with an embodiment.
Figure 9B:
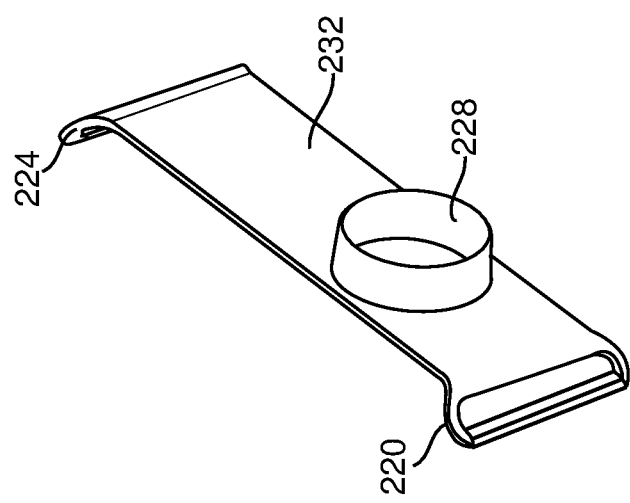
FIG. 9B is a perspective view of the securing plate without a strap attached, in accordance with an embodiment.

FIG. 9A is an enlarged view of the securing plate 124 showing the cylindrical protrusion 228, in accordance with an embodiment. FIG. 9B is a perspective view of the securing plate 124 without a strap attached, in accordance with an embodiment. The securing plate 124 includes a flat portion 232, a rear loop 224 at a first end of the flat portion 232, and a front loop 220 at a second end of the flat portion 232. The rear loop 224 and the front loop 220 are angled upwardly with respect to the flat portion 232 of the securing plate 124. The securing plate 124 further includes a cylindrical protrusion 228 on the back side of the flat portion 232.

Figure 9C:
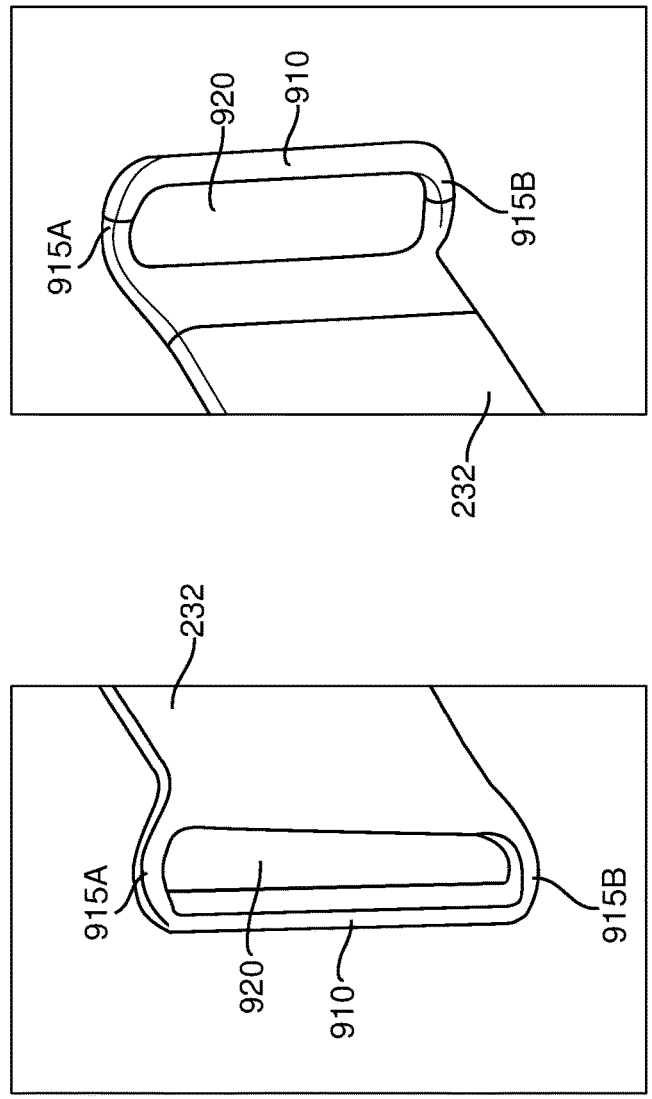
FIG. 9C is an enlarged view of the front and rear loops of the securing plate, according with an embodiment.

FIG. 9C is an enlarged view of the front and rear loops of the securing plate, according with an embodiment. Each of the front and rear loops 220, 224 include a top bar 910 and two side posts 915. In some embodiments, the side posts 915 are curved outwardly. One side of each of the side posts 915 is coupled to the flat portion 232 and the opposite side of the side post 915 is coupled to the top bar 910. The front loop 220 is configured to allow a strap to be inserted through a gap 920 formed between the flat portion 232, the top bar 910 and both side posts 915. The front loop 220 is further configured to allow the strap to wrap around the top bar 910 so that the strap can be folded back onto itself.

Figure 10A:
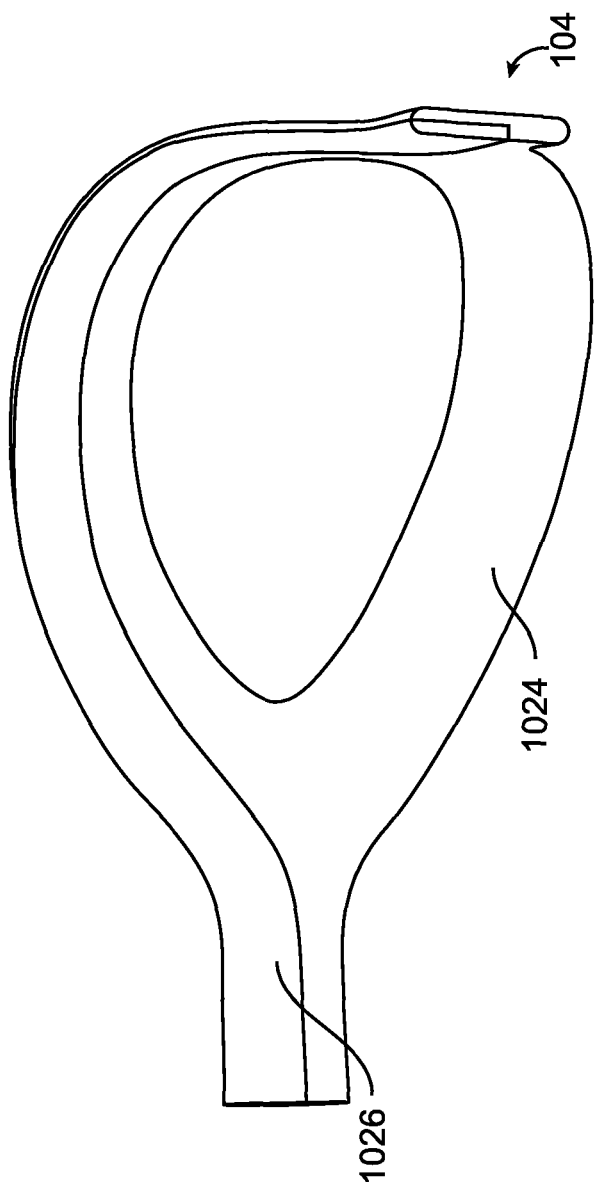
FIG. 10A is a perspective view of a back portion of the strap system, in accordance with an embodiment.

FIG. 10A is a perspective view of the back portion 104 of the strap system, in accordance with an embodiment. The back portion 104 is made of at least two portions, one is a base back portion 1024 and the other is a support portion 1026. The base back portion 1024 is more flexible compared to the support portion 1026. The base back portion 1024 is less flexible than the support portion 1026 and provides structural support for the strap system. That is, the durometer value for the material of the base back portion 104 is lower than the durometer value for the material of the support portion 1026. In one embodiment, the support portion 1026 extends along the left and right straps and the upper bridge 114 but not in the lower bridge 110.

Figure 10B:
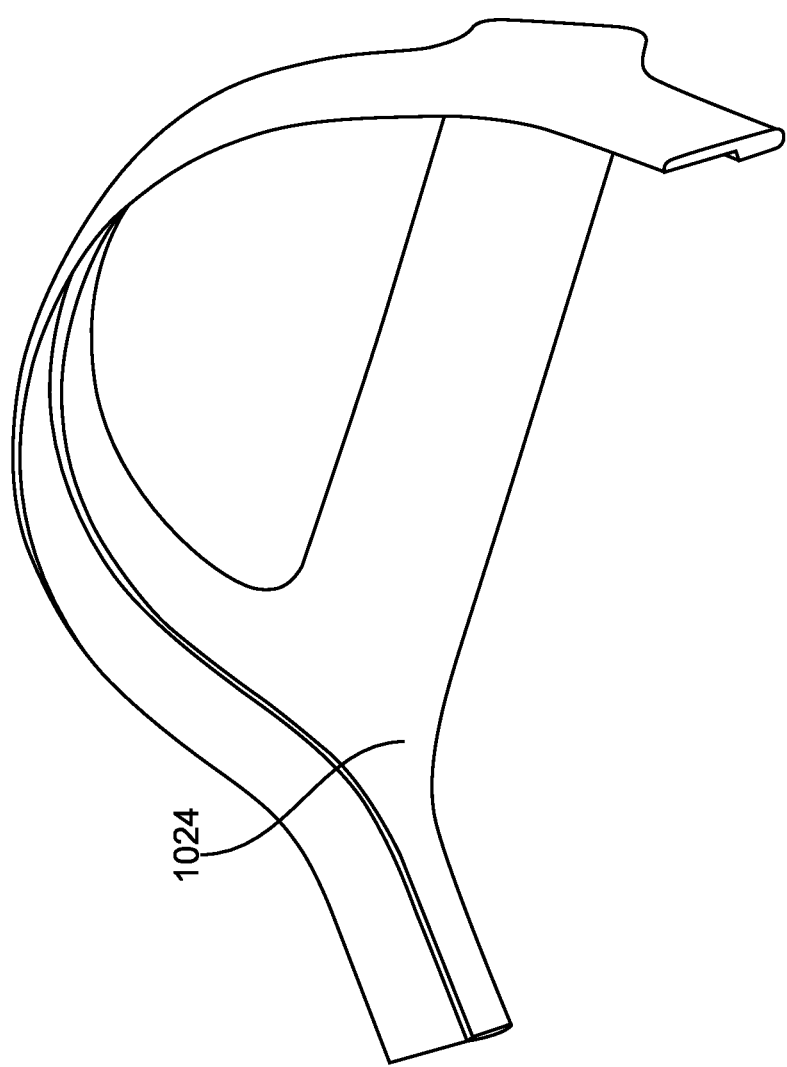
FIG. 10B is a perspective view of a base back portion of the strap system, in accordance with an embodiment.
Figure 10C:
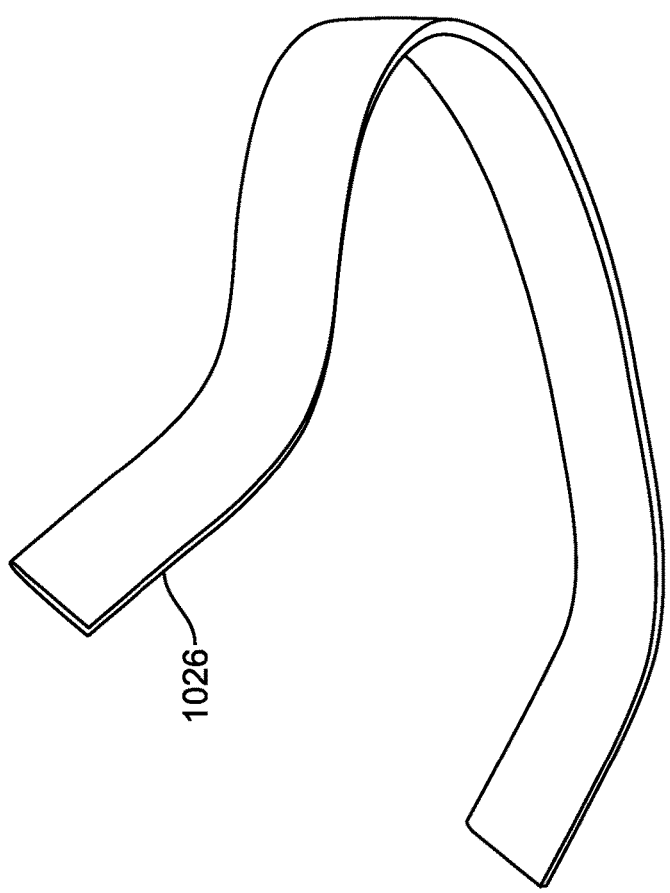
FIG. 10C is a perspective view of a support portion of the strap, in accordance with an embodiment.

FIG. 10B is a perspective view of a base back portion of the strap, in accordance with an embodiment. FIG. 10C is a perspective view of a support portion of the strap, in accordance with an embodiment.

The foregoing description of the embodiments has been presented for the purpose of illustration; it is not intended to be exhaustive or to limit the embodiments to the precise forms disclosed.

The language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A head-mounted display comprising:
   a body;
   a plurality of securing plates including a first securing plate and a second securing plate, each securing plate configured to be secured to the body of the head-mounted display in a rotatable manner, each securing plate comprising:
     a flat portion,
     a cylindrical protrusion at a side facing the body of the head-mounted display, the cylindrical protrusion attached to a hole in the body of the head-mounted display so that the securing plate rotates about the cylindrical protrusion;
     a rear loop at a first end of the flat portion, and
     a front loop at a second end of the flat portion opposite to the first end, the rear loop and the front loop angled with respect to the flat portion; and
   a strap comprising:
     a first segment inserted through the rear loop and the front loop of the first securing plate, an end portion of the first segment flipped over the front loop and secured to a portion of the first segment on the flat portion of the securing plate to fix the strap to the first securing plate, and
     a second segment inserted through the rear loop and the front loop of the second securing plate, an end portion of the second segment flipped over the front loop and secured to a portion of the second segment on the flat portion of the securing plate to fix the strap to the second securing plate.

2. The head-mounted display of claim 1, wherein the strap further comprises:
   an upper bridge connecting the first segment and the second segment of the strap, the upper bridge comprising:
     a base back portion, and
     a support portion more rigid than the base back portion; and
   a lower bridge below the upper bridge and connecting the first segment and the second segment of the strap.

3. A strap system comprising:
   a securing plate configured to secure to a body of a head-mounted display in a rotatable manner, the securing plate comprising:
     a flat portion,
     a rear loop at a first end of the flat portion, and
     a front loop at a second end of the flat portion, the second end opposite to the first end; and
   a strap inserted through the rear loop and the front loop, an end portion of the strap flipped over the front loop and secured to a portion of the strap on the flat portion of the securing plate to fix the strap to the securing plate.

4. The strap system of claim 3, wherein the securing plate further comprises a cylindrical protrusion at a side facing the body of the head-mounted display, the cylindrical protrusion received in a hole in the body of the head-mounted display so that the securing plate rotates about the cylindrical protrusion.

5. The securing plate of claim 3, wherein the rear loop and the front loop are angled with respect to the flat portion.

6. The strap system of claim 3, further comprising:
   another securing plate;
   another strap secured to the body of the head-mounted display by the other securing plate;
   an upper bridge connecting the strap and the other strap; and
   a lower bridge below the upper bridge and connecting the strap and the other strap.

7. The strap system of claim 6, wherein the upper bridge comprises a base back portion and a support portion more rigid than the base back portion.

8. The strap system of claim 7, wherein the lower bridge does not include the support portion.

9. The strap system of claim 6, further comprising:
   a center bridge, a first end of the center bridge connected the upper bridge, and a second end of the center bridge attached to the body of the head-mounted display.

10. The strap system of claim 9, wherein the second end of the center bridge is looped around an opening in an upper portion of the body of the head-mounted display.

11. A securing plate for securing a strap to a head-mounted display, comprising:
    a flat portion,
    a rear loop at a first end of the flat portion, and
    a front loop at a second end of the flat portion, opposite from the first end a cylindrical protrusion at a side facing a body of the head-mounted display, the cylindrical protrusion being located between the front loop and the rear loop and for being attached to a hole in the body of the head-mounted display so that the securing plate is able to rotate about the cylindrical protrusion; and wherein the securing plate is configured to allow a strap to be inserted through the rear loop and the front loop, an end portion of the strap flipped over the front loop and secured to a second portion of the strap on the flat portion of the securing plate to fix the strap to the securing plate.

12. The securing plate of claim 11, wherein the cylindrical protrusion is closer to the front loop than the rear loop.

13. The securing plate of claim 11, wherein the rear loop and the front loop are angled with respect to the flat portion.

14. The securing plate of claim 11, wherein the cylindrical protrusion is located closer to the front loop than the rear loop.

15. The securing plate of claim 11, wherein the rear loop and the front loop are symmetrical to each other.

\* \* \* \* \*